United States Patent
Nagai et al.

(10) Patent No.: US 6,619,846 B1
(45) Date of Patent: Sep. 16, 2003

(54) ACTUATOR

(75) Inventors: Shigekazu Nagai, Tokyo (JP); Akio Saitoh, Kawaguchi (JP); Masaru Saitoh, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 6 days.

(21) Appl. No.: 09/868,320

(22) PCT Filed: Oct. 17, 2000

(86) PCT No.: PCT/JP00/07185
§ 371 (c)(1),
(2), (4) Date: Jun. 18, 2001

(87) PCT Pub. No.: WO01/29450
PCT Pub. Date: Apr. 26, 2001

(30) Foreign Application Priority Data

Oct. 18, 1999 (JP) .................................. 11-296020

(51) Int. Cl.[7] ............................................. F16C 29/04
(52) U.S. Cl. ............................... 384/45; 384/43; 384/44
(58) Field of Search ............................ 384/43, 44, 45; 74/89.33

(56) References Cited

U.S. PATENT DOCUMENTS

| | | | | | |
|---|---|---|---|---|---|
| 4,677,869 A | * | 7/1987 | Mayfield | ............... | 74/424.83 |
| 4,952,075 A | * | 8/1990 | Rogers, III | ............... | 384/43 |
| 5,431,498 A | * | 7/1995 | Lyon | ............... | 384/45 |
| 5,499,547 A | * | 3/1996 | Nagai et al. | ............... | 108/143 |
| 5,676,038 A | * | 10/1997 | Hosono et al. | ............... | 92/146 |
| 5,755,515 A | * | 5/1998 | Senjo et al. | ............... | 384/45 |
| 6,109,789 A | * | 8/2000 | Chen | ............... | 384/44 |
| 6,346,788 B1 | * | 2/2002 | Nagai et al. | ............... | 318/432 |

FOREIGN PATENT DOCUMENTS

| | | |
|---|---|---|
| JP | 08-126247 | 5/1996 |
| JP | 08-130849 | 5/1996 |

* cited by examiner

Primary Examiner—David A. Bucci
Assistant Examiner—Julie K. Smith
(74) Attorney, Agent, or Firm—Paul A. Guss

(57) ABSTRACT

A guide mechanism is provided with first guide rails each having a circular arc-shaped cross section to be installed to first long grooves each having a circular arc-shaped cross section formed on an inner wall surface of a frame, and second guide rails each having a circular arc-shaped cross section to be installed to second long grooves each having a circular arc-shaped cross section formed on side surfaces of a slider opposed to the inner wall surface of the frame. Accordingly, the arrangement of ball-rolling grooves in the slider can be performed more freely, and it is possible to mitigate the concentration of stress exerted by external force.

17 Claims, 15 Drawing Sheets

F I G.15
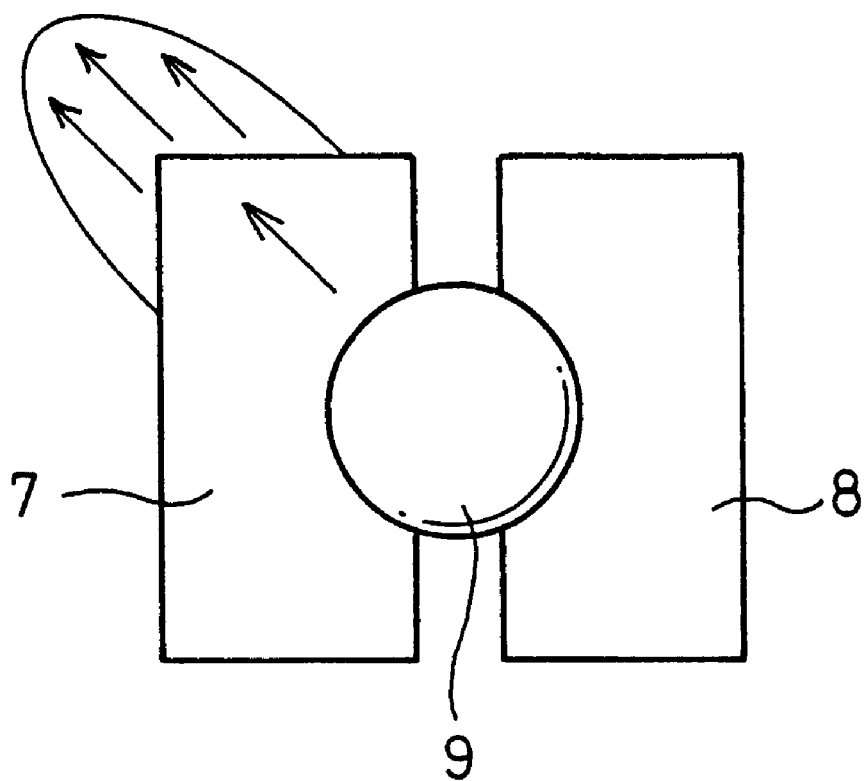

ACTUATOR

BACKGROUND OF THE INVENTION

1. Field of the Invention

The present invention relates to an actuator which makes it possible to move a slider linearly reciprocatively along a frame in accordance with a driving action of a driving source.

2. Description of the Related Art

A transport means such as an actuator has been hitherto used, for example, in order to transport a workpiece.

A conventional actuator is shown in FIG. 14 (see, for example, Japanese Laid-Open Patent Publication Nos. 8-126247 and 8-130849).

The conventional actuator comprises a base 1 which is integrally formed with a bottom wall and a pair of side walls perpendicular to the bottom wall, a ball screw shaft 2 which is rotatable in accordance with a driving action of an unillustrated servo motor, and a slider 4 which is displaceable in the axial direction of the base 1 by the aid of a ball nut 3 screw-engaged with the ball screw shaft 2.

Base-side grooves 5, each of which has a rectangular cross section, are formed on inner wall surfaces of the side walls respectively. Slider-side grooves 6, each of which has the same shape as that of the base-side groove 5, are formed at portions of the slider 4 opposed to the base-side grooves 5. Base-side rails 7, each of which has a rectangular cross section corresponding to the base-side groove 5 and each of which has a ball-rolling groove formed on a side surface thereof, are installed to the base-side grooves 5. On the other hand, slider-side rails 8, each of which has a rectangular cross section corresponding to the slider-side groove 6 and each of which has a ball-rolling groove formed on a side surface thereof, are installed to the slider-side grooves 6.

A plurality of balls 9, which circulate and roll in accordance with the displacement of the slider 4, are installed between the mutually opposing ball-rolling grooves of the base-side rails 7 and the ball-rolling grooves of the slider-side rails 8.

However, in the conventional actuator, each of the base-side rail 7 installed to the base-side groove 5 and the slider-side rail 8 installed to the slider-side groove 6 is formed to have the rectangular cross section. Therefore, when the balls 9 roll along the ball-rolling grooves as endless circulating tracks, the stress is concentrated on rectangular angular portions of the base-side groove 5 and the slider-side groove 6 (see FIG. 15). Therefore, the durability of the base-side rail 7 and the slider-side rail 8 low.

Further, it is desirable to reduce the size of a shape of a flange section of the ball nut 3 to which the ball screw shaft 2 is screw-engaged, and decrease the installation area with respect to the slider 4 so that the arrangement of the ball-rolling hole as the endless circulating track in the slider 4 can be designed more freely.

An object of the present invention is to provide an actuator which allows the arrangement of a ball-rolling hole in a slider to be performed more freely and mitigates the concentration of stress exerted by the external force.

SUMMARY OF THE INVENTION

According to the present invention, a first guide rail, which is installed to a first long groove, is formed to have a circular arc-shaped cross section, and a second guide rail, which is installed to a second long groove, is formed to have a circular arc-shaped cross section. Accordingly, it is possible to mitigate the concentration of stress by the external force, and it is possible to improve the durability of the first guide rail and the second guide rail.

Further, according to the present invention, a first slide cover and a second slide cover have different shapes. A surface area of the first slide cover is smaller than a surface area of the second slide cover. Accordingly, the arrangement of a ball-rolling hole in a slider can be designed more freely.

Further, according to the present invention, the first slide cover having a small surface area is installed to a first end side in the axial direction of a slider. The second slide cover having a large surface area is installed to a second end side of the slider arranged with a driving source disposed on the side opposite to the first slide cover. Accordingly, it is possible to ensure the orientation of assembling.

BRIEF DESCRIPTION OF THE DRAWINGS

FIG. 15 illustrates the distribution of stress exerted on a base-side rail or a slider-side rail of the actuator shown in FIG. 14.

DETAILED DESCRIPTION OF THE PREFERRED EMBODIMENTS

Figure 1:
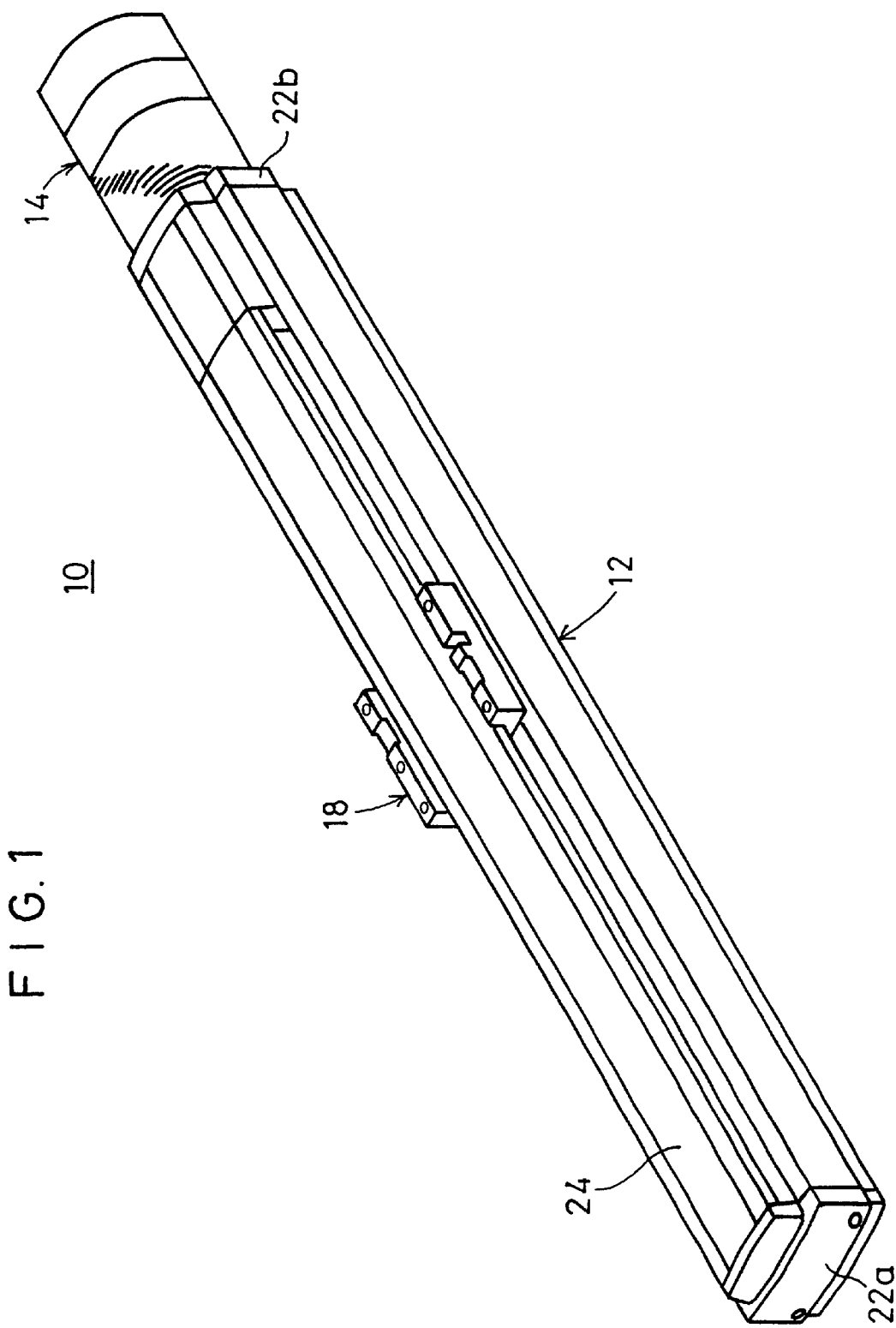
FIG. 1 shows a perspective view illustrating an actuator according to an embodiment of the present invention.

With reference to FIG. 1, reference numeral 10 indicates an actuator according to an embodiment of the present invention.

The actuator 10 comprises an elongated U-shaped frame 12 which includes a bottom wall and a pair of side walls substantially perpendicular to the bottom wall, a rotary driving source 14 which is connected to a first end of the frame 12, a driving force-transmitting mechanism 16 (see FIG. 2) which transmits the rotary driving force of the rotary driving source 14 by the aid of an unillustrated coupling member, a slider 18 which makes reciprocating motion in the axial direction of the frame 12 in accordance with the action of the driving force transmitted by the driving force-transmitting mechanism 16, and a guide mechanism 20 which guides the slider 18 along the frame 12. It is preferable that the frame 12 is formed of a metal material such as steel and aluminum, and the slider 18 is formed of a metal material such as aluminum and steel.

As shown in FIG. 1, a pair of end covers 22a, 22b are installed to both ends of the frame 12 in the axial direction. A top cover 24 for closing an opening of the frame 12 is supported by the pair of end covers 22a, 22b. A recess 26 (see FIG. 2), which has a circular arc-shaped cross section, is formed in the axial direction at a substantially central portion of the inner wall surface of the frame 12.

Figure 2:
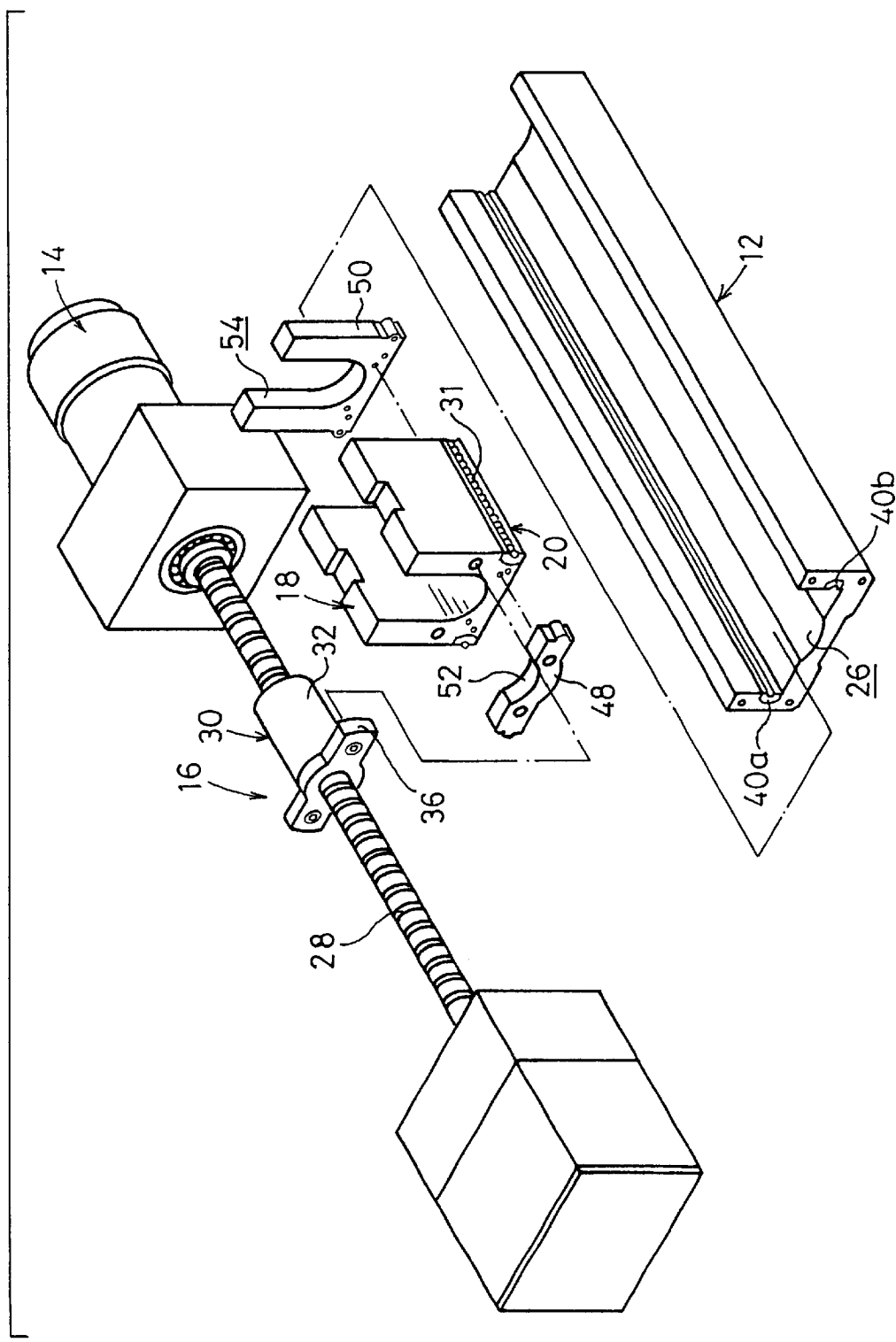
FIG. 2 shows an exploded perspective view illustrating major parts of the actuator.
Figure 4:
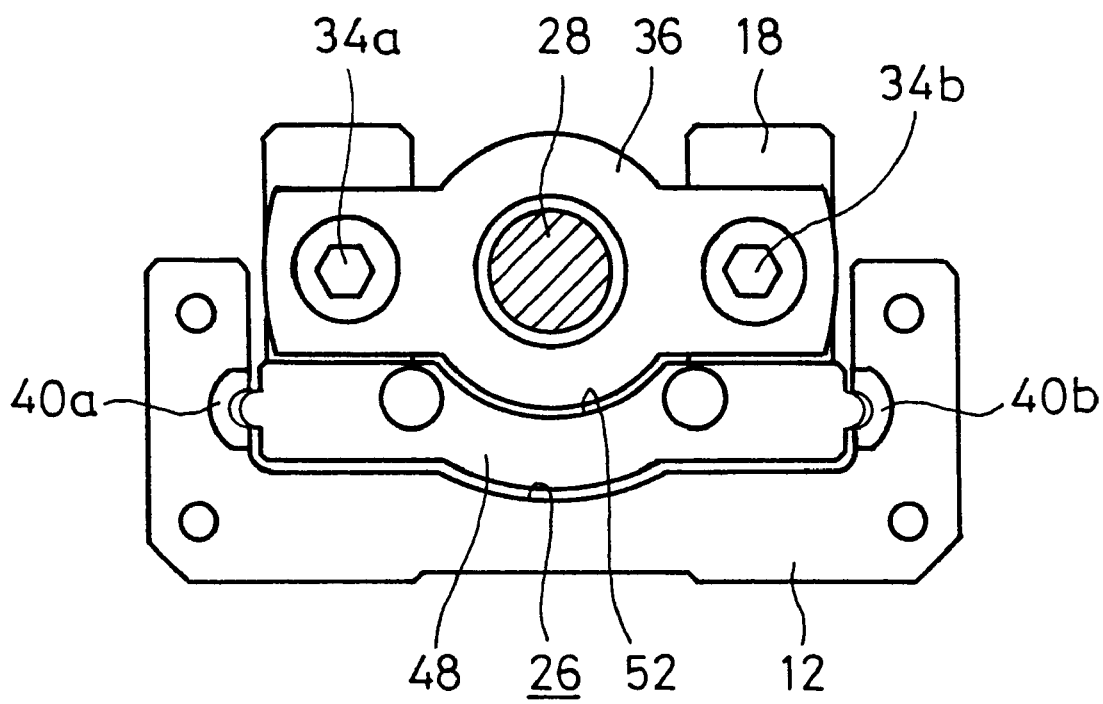
FIG. 4 shows, with partial cross section, a side view as viewed from a first end side of a frame.

As shown in FIG. 2, the driving force-transmitting mechanism 16 comprises a ball screw shaft 28 which is coaxially connected to a drive shaft of the rotary driving source 14 by the aid of the unillustrated coupling member, a ball screw nut 30 which is formed with a penetrating screw hole to be screw-engaged with the ball screw shaft 28, and a plurality of balls 31 which are provided rollably between the ball screw shaft 28 and the screw hole and which roll along an unillustrated endless circulating track formed on the ball screw nut 30. The ball screw nut 30 includes a cylindrical section 32 which is formed with the penetrating screw hole, and a flange section 36 which is formed integrally at a first end of the cylindrical section 32 and which is fixed to the slider 18 by the aid of screw members 34a, 34b (see FIG. 4).

Figure 5:
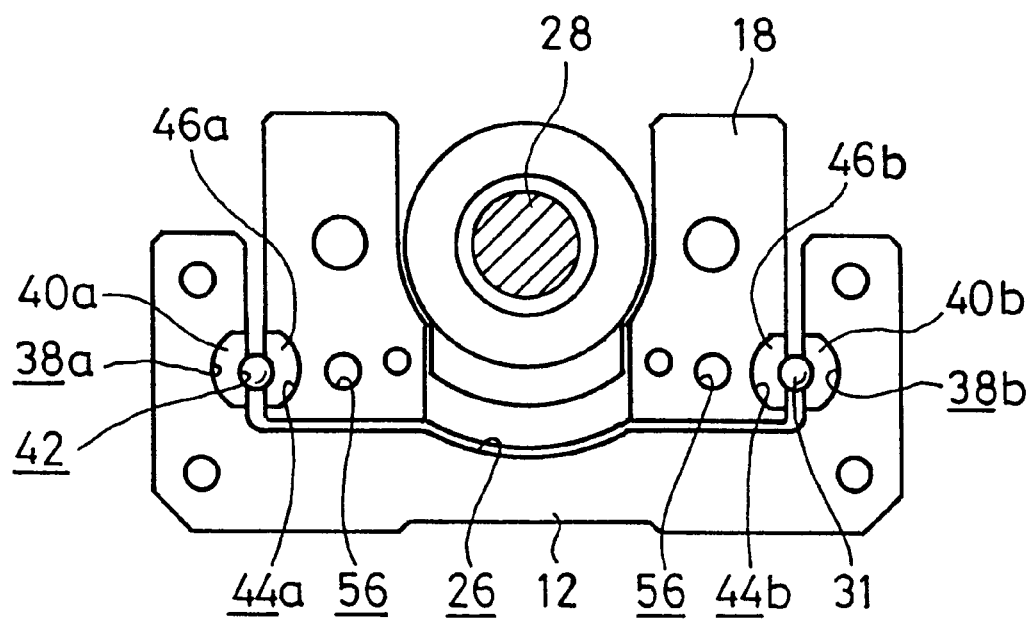
FIG. 5 shows, with partial cross section, a side view illustrating a state in which a first end cover is removed in FIG. 4.
Figure 6:
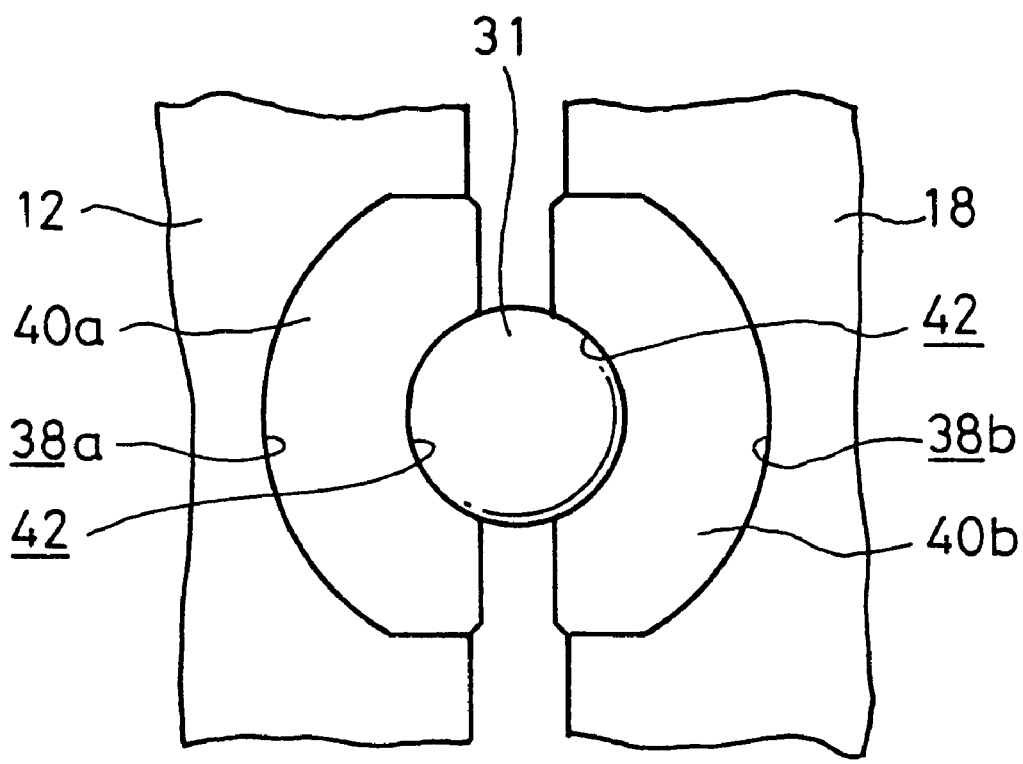
FIG. 6 shows a partial magnified view illustrating shapes of a first guide rail and a second guide rail.

As shown in FIG. 5, the guide mechanism 20 includes a pair of opposing first long grooves 38a, 38b which extend in the axial direction of the frame 12 at portions close to the bottom surface of the inner wall of the frame 12 and each of which has a vertical cross section formed to have a circular arc-shaped configuration, and a pair of first guide rails 40a, 40b each of which is formed to have a circular arc-shaped cross section corresponding to the cross-sectional configuration of the first long groove 38a, 38b and which are secured to the first long grooves 38a, 38b. The first guide rail 40a, 40b is formed with a ball-rolling groove 42 having a circular arc-shaped cross section (see FIG. 6).

The guide mechanism 20 further includes a pair of second long grooves 44a, 44b which are formed on the side surfaces of the slider 18 opposed to the inner wall of the frame 12 and each of which has a vertical cross section formed to have a circular arc-shaped configuration, and second guide rails 46a, 46b each of which is formed to have a circular arc-shaped cross section corresponding to the cross-sectional configuration of the second long groove 44a, 44b and which are secured to the second long grooves 44a, 44b. The second guide rail 46a, 46b is formed with a ball-rolling groove 42 having a circular arc-shaped cross section (see FIG. 6).

Figure 7:
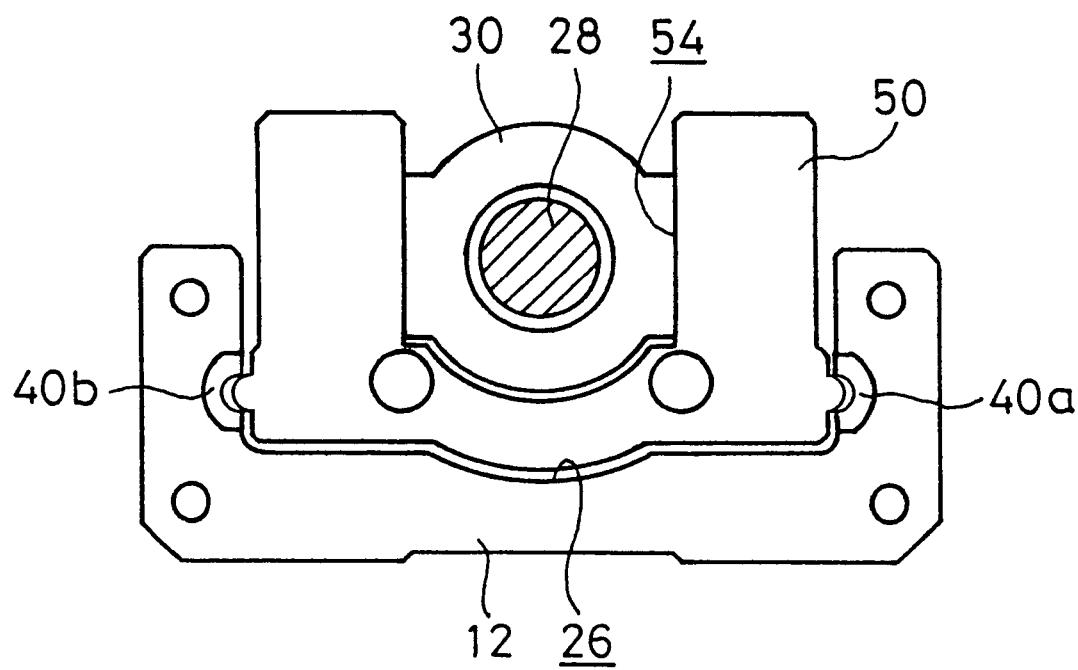
FIG. 7 shows, with partial cross section, a side view as viewed from a second end side of the frame.

The guide mechanism 20 further includes a first slide cover 48 (see FIGS. 2 and 4) which is screw-fastened to the lower side of the slider 18 so that it is substantially parallel to the flange section 36 of the ball screw nut 30, and a second slide cover 50 (see FIGS. 2 and 7) which is screw-fastened to the end surface of the slider 18 on the side opposite to the first slide cover 48. A curved surface 52, which functions as a relief area for the cylindrical section 32 for constructing the ball screw nut 30, is formed at a central upper portion of the first slide cover 48. On the other hand, an opening 54, which has a substantially U-shaped cross section in order to install the cylindrical section 32, is formed on the second slide cover 50.

Unillustrated ball return grooves are formed in the first slide cover 48 and the second slide cover 50. In this arrangement, the endless circulating tracks, in which the plurality of balls 31 roll, are constructed by the ball-rolling grooves 42 of the first guide rails 40a, 40b and the second guide rails 46a, 46b, penetrating ball-rolling holes 56 formed through the slider 18 (see FIG. 5), and the unillustrated ball return groves.

The first slide cover 48 and the second slide cover 50 have mutually different shapes. The surface area of the first slide cover 48 is smaller than that of the second slide cover 50.

That is, the surface area of the first slide cover 48 is small, and the size of the flange section 36 of the ball screw nut 30 to be screw-engaged with the ball screw shaft 28 is reduced to decrease the installation area with respect to the slider 18. Accordingly, the arrangement of the ball-rolling hole 56 as the endless circulating track in the slider 18 can be designed more freely.

Figure 3:
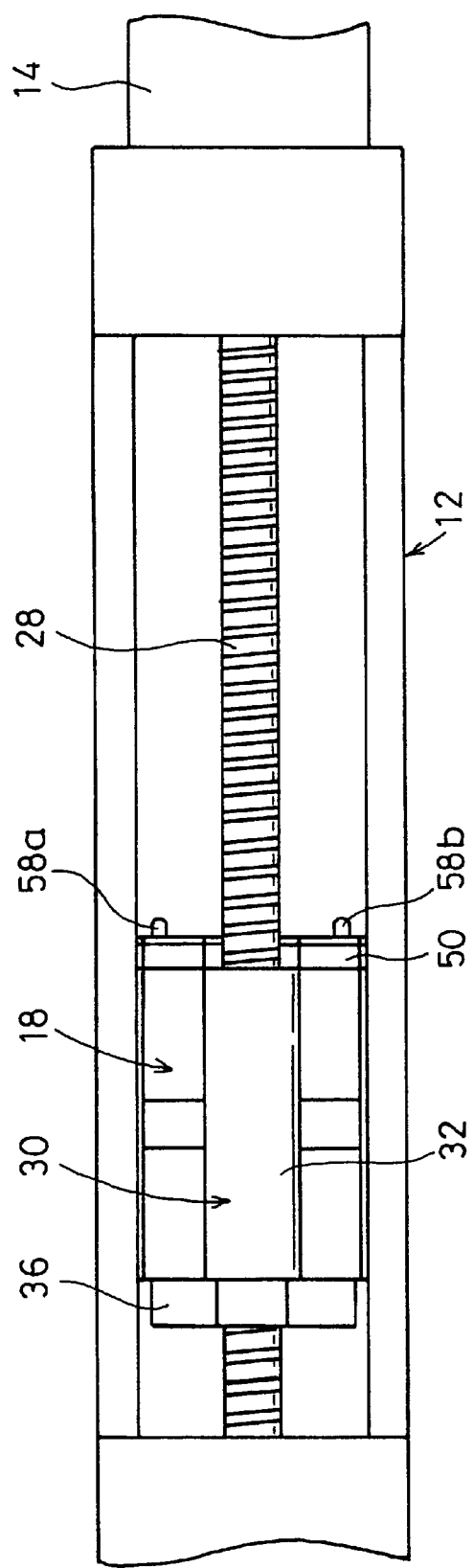
FIG. 3 shows, with partial omission, a plan view illustrating a state in which a top cover of the actuator is removed.

The wide second slide cover 50 is installed to the first end of the slider 18 on the side of the rotary driving source 14. The narrow first slide cover 48 is installed to the second end surface of the slider 18 disposed on the side opposite to the above. A pair of grease nipple sections 58a, 58b, which are used to supply grease via passages (not shown) communicating with the unillustrated ball return grooves, are provided on the upper side of the second slide cover 50 while being separated from each other by a predetermined spacing distance (see FIG. 3).

The first slide cover 48 and the second slide cover 50, which are installed to the both ends of the slider 18 respectively, have the different shapes. Therefore, the components of the actuator 10 can be correctly assembled without confusing the assembling direction in the assembling operation as described later on.

The actuator 10 according to the embodiment of the present invention is basically constructed as described above. Next, its operation, function, and effect will be explained.

At first, a method for assembling the actuator 10 will be explained.

Figure 8:
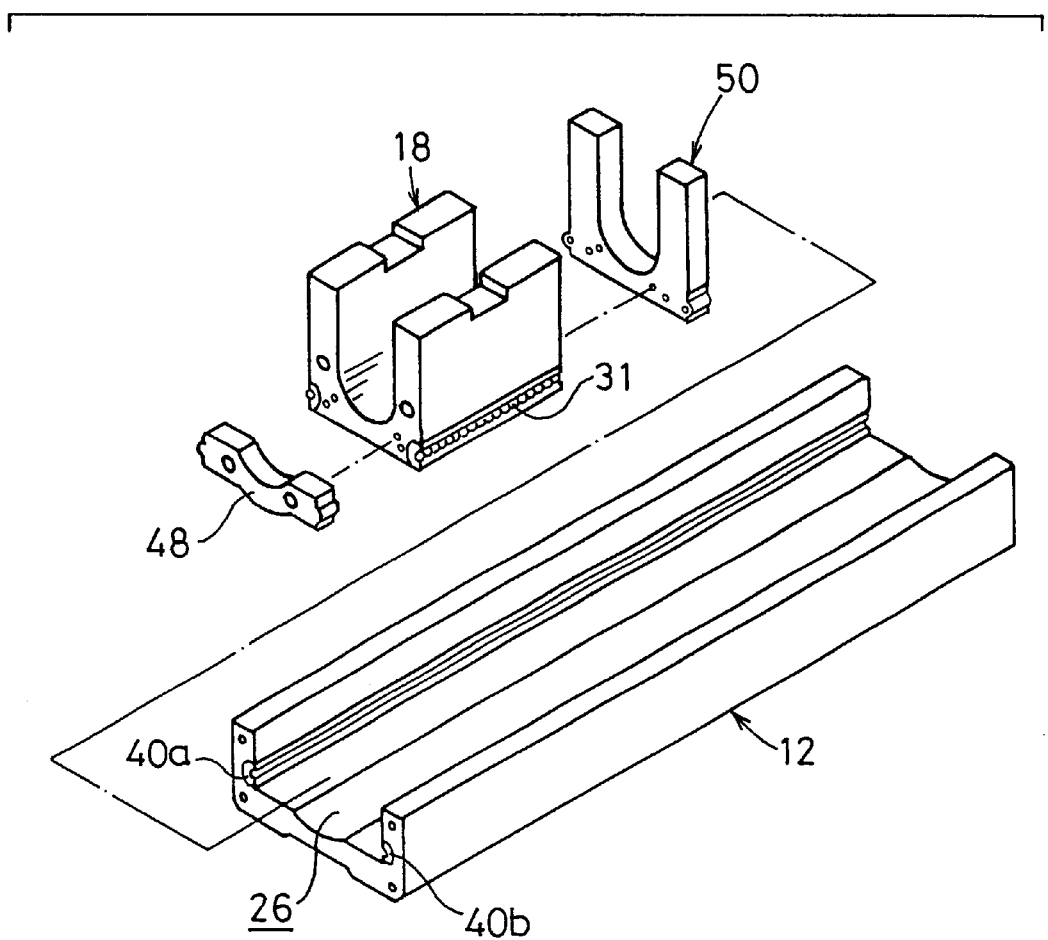
FIG. 8 shows a perspective view illustrating an assembling step.

At first, as shown in FIG. 8, the first slide cover 48 and the second slide cover 50 are installed to the both end surfaces of the slider 18 by the aid of unillustrated screw members to assemble the slider 18 into the recess of the frame 12. In this embodiment, the orientation is set so that the wide second slide cover 50 is installed to the first end side of the slider 18 at which the rotary driving source 14 is connected to the frame 12, and the narrow first slide cover 48 is installed to the second end side of the slider 18 opposite thereto.

Figure 9:
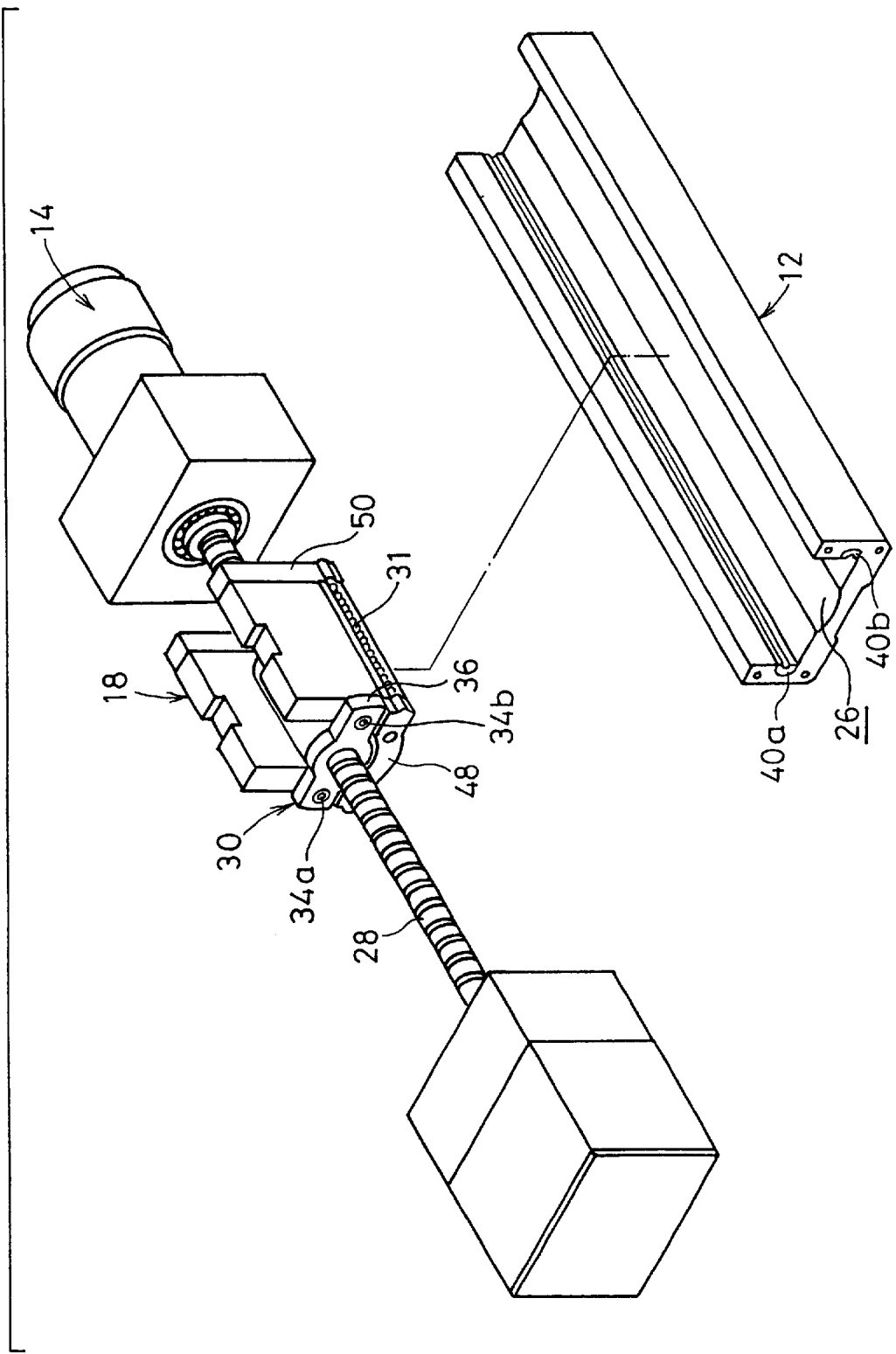
FIG. 9 shows a perspective view illustrating the assembling step.

Subsequently, as shown in FIG. 9, the flange section 36 of the ball screw nut 30 is fastened to the end surface of the slider 18 by the aid of the pair of screw members 34a, 34b. Accordingly, the ball screw unit, to which the end covers 22a, 22b and the rotary driving source 14 are connected to the both ends respectively, is installed to the slider 18 and the frame 12. During this process, the flange section 36 is screw-fastened to the end surface of the slider 18 to which the narrow first slide cover 48 is installed. Accordingly, the wide second slide cover 50 is installed to the first end side of the slider 18 at which the rotary driving source 14 is connected to the frame 12. Thus, the components can be reliably assembled in the correct assembling direction without confusing the assembling direction.

The orientation of the assembling will now be explained.

Figure 10:
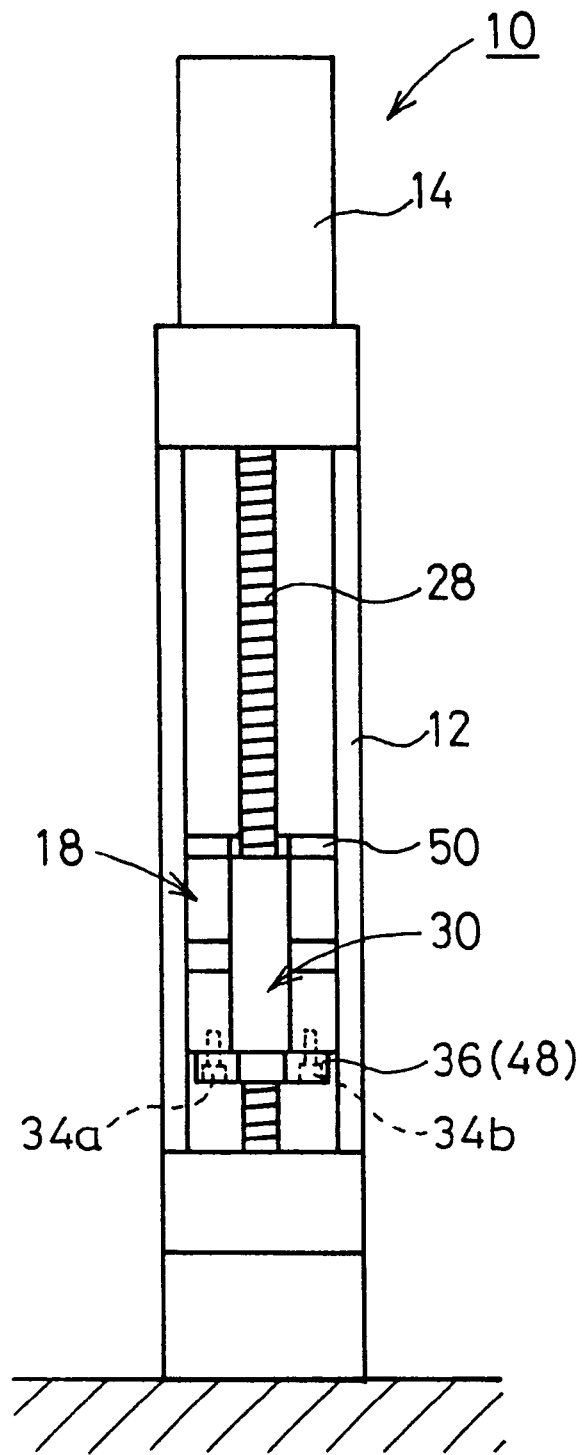
FIG. 10 shows a side view to be used to illustrate the orientation in the assembling step.
Figure 11:
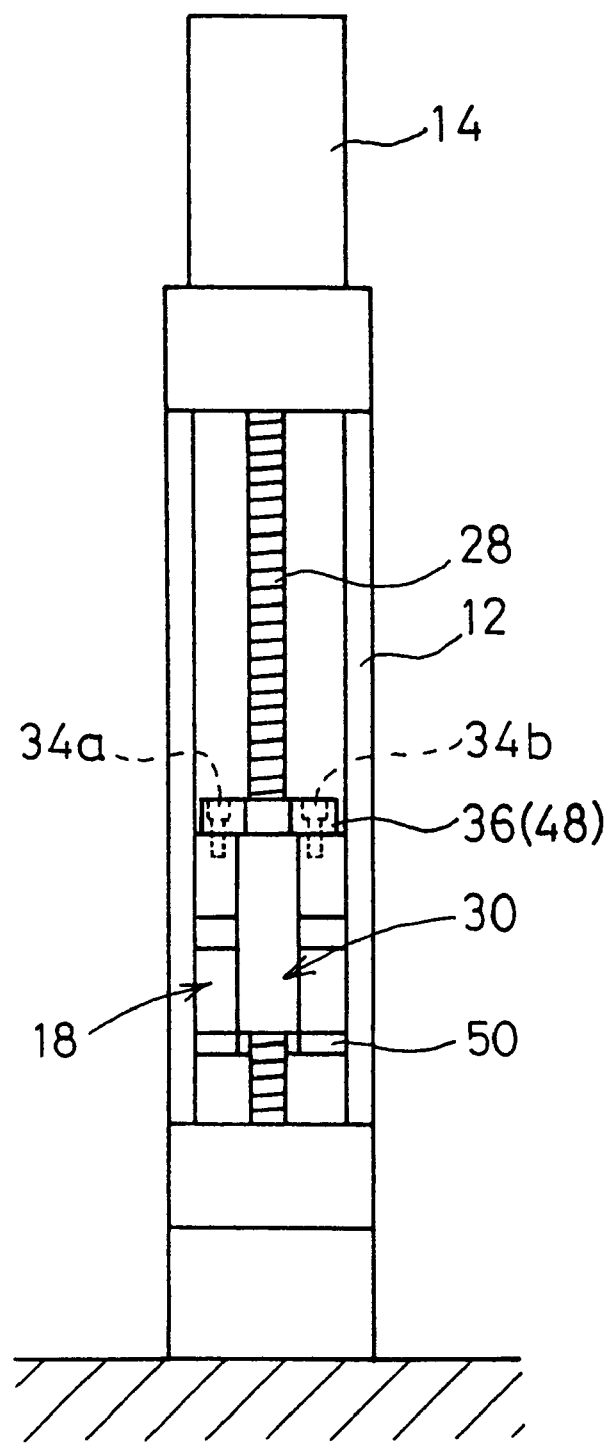
FIG. 11 shows a side view to be used to illustrate the orientation in the assembling step.

As shown in FIG. 10, when the actuator 10 according to the embodiment of the present invention is attached in an upstanding state in the substantially vertical direction with the rotary driving source 14 being disposed on the upper side, the load, which is applied by a workpiece, is supported via the slider 18 by the whole of the flange section 36 and the cylindrical section 32 of the ball screw nut 30. As shown in FIG. 11, if the assembling is performed in the opposite direction of the assembling direction for the first slide cover 48 and the second slide cover 50, i.e., if the assembling is performed so that the first slide cover 48 is installed on the side of the rotary driving source 14, then the load, which is applied by a workpiece, is supported via the slider 18 by the pair of screw members 34a, 34b for fastening the flange section 36 of the ball screw nut 30.

As described above, if the assembling direction is confused for the first slide cover 48 and the second slide cover 50, the excessive load is exerted on the pair of screw members 34a, 34b. However, in the embodiment of the present invention, the first and second slide covers 48, 50 are formed to have the different configurations respectively in order to install the first slide cover 48 having the small surface area and the second slide cover 50 having the surface area larger than that of the first slide cover 48 while visually confirming them. Further, the first slide cover 48 having the small surface area can be assembled simply to the flange section 36 of the ball screw nut 30 so that they are substantially parallel to one another. Thus, the assembling orientation is not confused, and it is possible to perform the assembling reliably and correctly.

Next, the operation of the actuator 10 will be explained.

When an unillustrated power source is energized, the rotary driving force of the rotary driving source 14 is transmitted to the ball screw shaft 28. The ball screw shaft 28, which is rotated in a predetermined direction, is screw-engaged with the screw hole of the ball screw nut 30. Accordingly, the slider 18, which is connected to the ball screw nut 30, is displaced integrally in the axial direction of the frame 12 in accordance with the guiding action of the guide mechanism 20. When the positive/negative polarity of the current flowing through the rotary driving source 14 is inverted in accordance with the control action of an unillustrated controller, the slider 18 can be moved reciprocatively in the axial direction of the frame 12.

Figure 12:
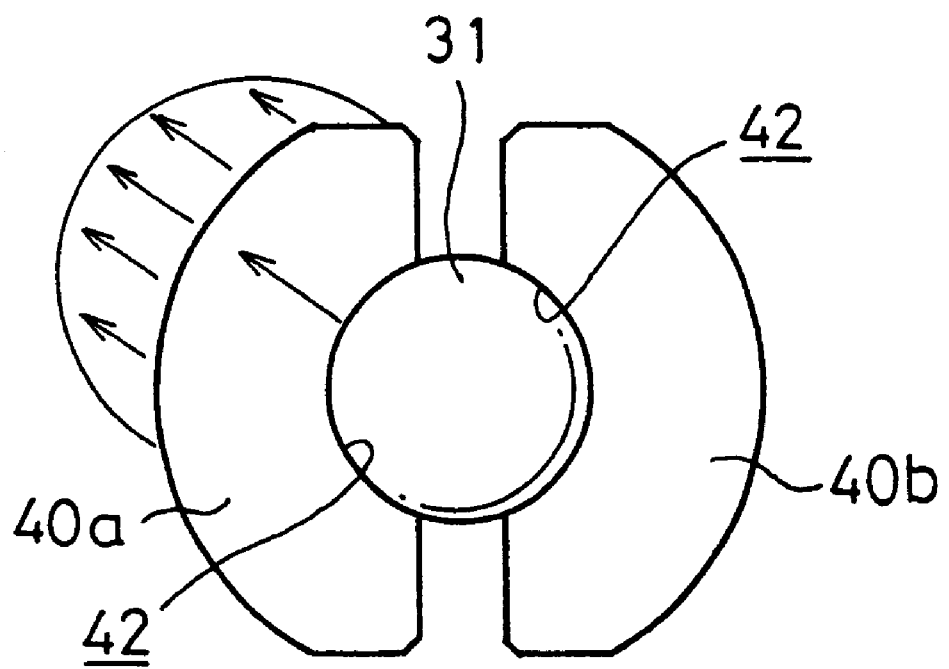
FIG. 12 illustrates the distribution of stress exerted on the first guide rail and the second guide rail shown in FIG. 6.

When the slider 18 makes the reciprocating motion in the axial direction of the frame 12, the plurality of balls 31 roll along the first guide rails 40a, 40b and the second guide rails 46a, 46b. In this embodiment, as shown in FIG. 12, when the plurality of balls 31 roll, the stress, which is exerted on the first guide rails 40a, 40b and the second guide rails 46a, 46b by the external force P applied by a workpiece or the like, has a distribution dispersed and arranged in a bending curved configuration. Therefore, when the vertical cross sections of the first guide rails 40a, 40b and the second guide rails 46a, 46b are formed to have the circular arc-shaped configurations, the concentration of stress exerted on the first guide rails 40a, 40b and the second guide rails 46a, 46b can be mitigated to improve the durability of the first guide rails 40a, 40b and the second guide rails 46a, 46b.

Figure 13:
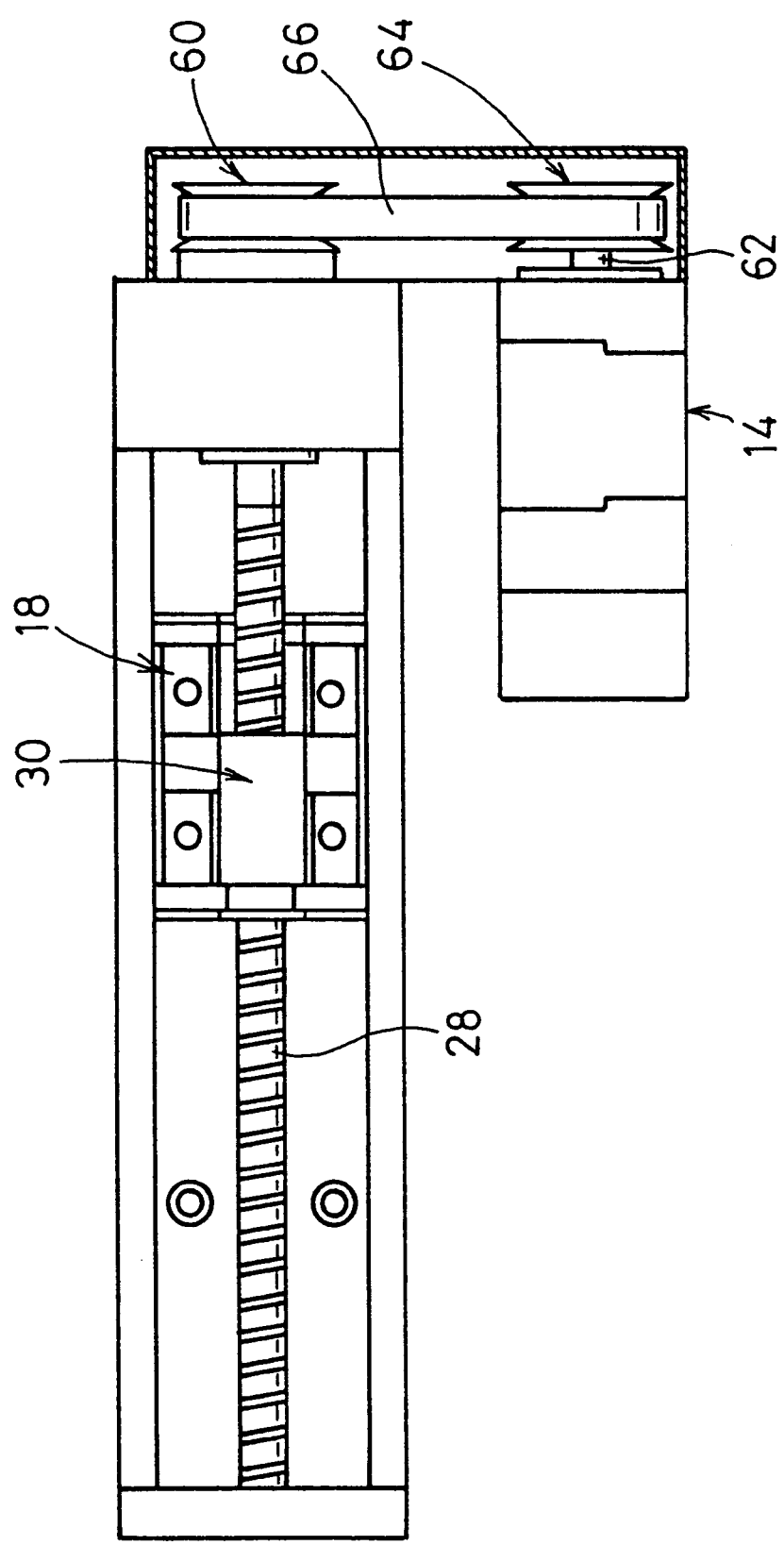
FIG. 13 shows, with partial cross section, a plan view illustrating an actuator according to a modified embodiment.
Figure 14:
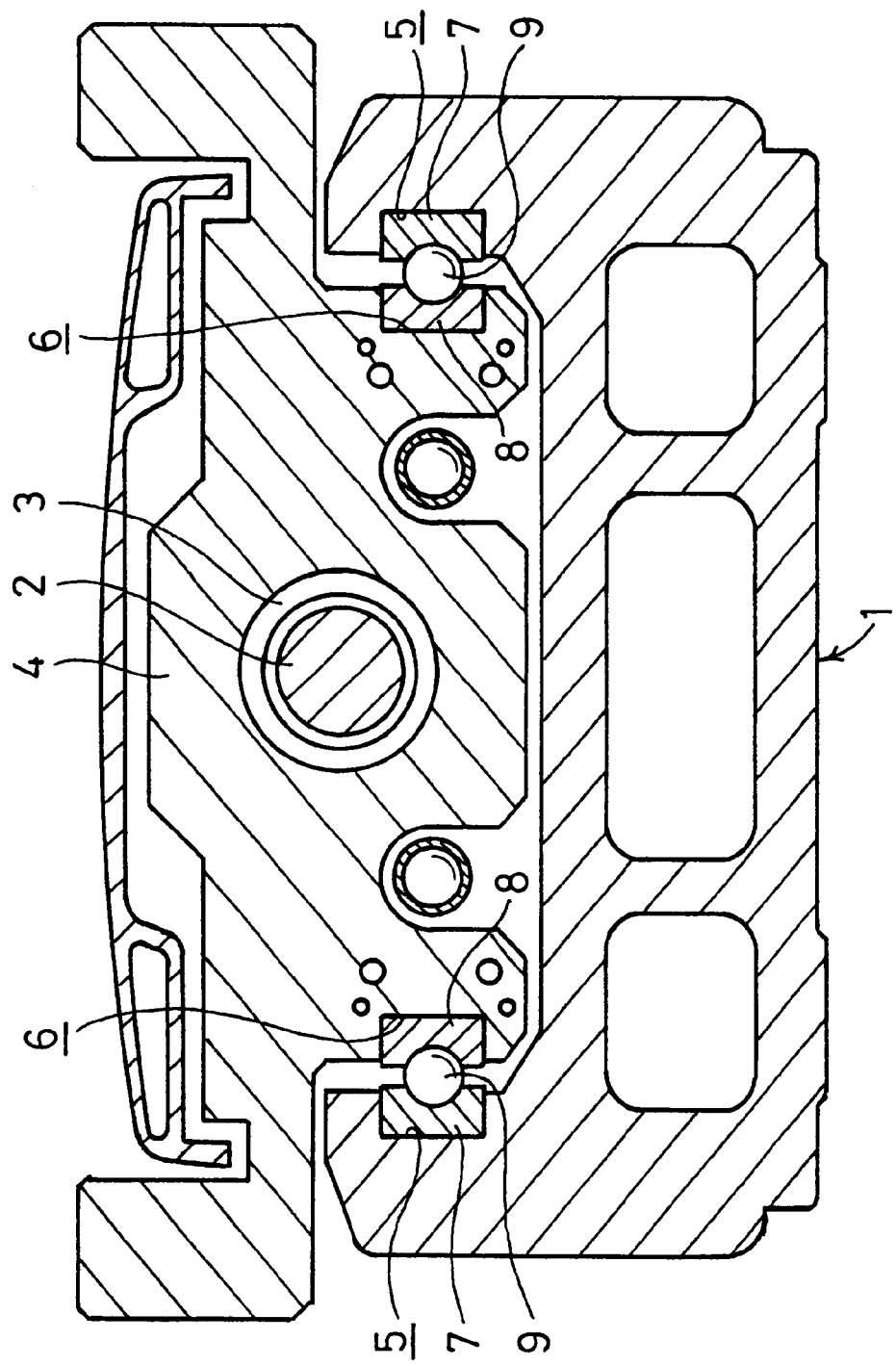
FIG. 14 shows a vertical sectional view illustrating a conventional actuator.

In the embodiment of the present invention, the ball screw shaft 28 and the rotary driving source 14 are connected coaxially. Alternatively, as shown in FIG. 13, when a timing belt 66, which runs over a first pulley 60 connected to the ball screw shaft 28 and a second pulley 64 connected to the rotary drive shaft 62 respectively, is used, the ball screw shaft 28 and the rotary driving source 14 may be arranged substantially in parallel to one another.

Further alternatively, in place of the rotary driving source 14, an unillustrated driving means such as a rodless cylinder or a fluid pressure cylinder may be used.

Further alternatively, the first guide rails 40a, 40b and the second guide rails 46a, 46b may be fixed by using unillustrated screw members. A lubricating oil supply means (not shown) for supplying grease from the outside to the ball-rolling grooves 42 of the first guide rails 40a, 40b and the second guide rails 46a, 46b may be provided.

Further alternatively, the first guide rails 40a, 40b may be inserted into the long grooves 38a, 38b without applying any machining thereto, and the dimension may be managed by adjusting the film thickness brought about by the surface treatment. On the other hand, for example, the long grooves 44a, 44b may be machined by means of the burnishing forming, the drawing forming, the thread rolling, the cold drawing forming, or the forging forming.

As for the accuracy of the ball-rolling groove 42, it is preferable to select optimum grease on the basis of the EHL theory (elastohydrodynamic lubrication theory).

According to the present invention, the first guide rail, which constitutes the guide mechanism, is formed to have the circular arc-shaped cross section, and the second guide rail is formed to have the circular arc-shaped cross section. Accordingly, it is possible to mitigate the concentration of stress exerted by the external force, and it is possible to improve the durability of the first guide rail and the second guide rail.

According to the present invention, the first slide cover and the second slide cover are formed to have the different shapes, and the surface area of the first slide cover is set to be smaller than the surface area of the second slide cover. Accordingly, the arrangement of the ball-rolling groove in the slider can be designed more freely.

Further, according to the present invention, the first slide cover having the small surface area is installed to the first end side of the slider in the axial direction, and the second slide cover having the large surface area is installed to the second end side of the slider arranged with the driving source disposed on the side opposite to the first slide cover. Accordingly, it is possible to ensure the orientation of the assembling.

What is claimed is:

1. An actuator comprising:
   a frame;
   a driving source connected to said frame;
   a driving force-transmitting mechanism for transmitting a driving force of said driving source;
   a slider for making reciprocating motion in an axial direction of said frame in accordance with an action of the driving force transmitted by said driving force-transmitting mechanism; and
   a guide mechanism for guiding said slider when said slider is displaced along said frame, wherein:
      said guide mechanism includes a first guide rail having a circular arc-shaped cross section, said first guide rail being immovably installed in a first long groove having a circular arc-shaped cross section formed on an inner wall surface of said frame, and a second guide rail having a circular arc-shaped cross section, said second guide rail being immovably installed in a second long groove having a circular arc-shaped cross section formed on a side surface of said slider opposed to said inner wall surface of said frame, and
      said guide mechanism includes a first slide cover and a second slide cover which have different configurations, said first slide cover is installed to a first end side in said axial direction of said slider, and said second slide cover is installed to a second end side of said slider arranged with said driving source disposed on said side opposite to said first slide cover.

2. The actuator according to claim 1, wherein said driving force-transmitting mechanism includes a ball screw shaft which is rotatable in a predetermined direction in accordance with a driving action of said rotary driving source, and a ball screw nut which is formed with a penetrating screw hole to be screw-engaged with maid ball screw shaft; and said ball screw nut comprises a cylindrical section and a flange section.

3. An actuator comprising:

frame;

driving source connected to said frame;

driving force-transmitting mechanism for transmitting a driving force of said driving source;

a slider for making reciprocating motion in an axial direction of said frame in accordance with an action of the driving force transmitted by said driving force-transmitting mechanism; and a guide mechanism for guiding said slider when said slider is displaced along said frame, wherein:

said guide mechanism includes a first guide rail having a circular arc-shaped cross section to be installed to a first long groove having a circular arc-shaped cross section formed on an inner wall surface of said frame, and a second guide rail having a circular arc-shaped cross section to be installed to a second long groove having a circular arc-shaped cross section formed on a side surface of said slider opposed to said inner wall surface of said frame, and said guide mechanism includes a first slide cover and a second slide cover which have different configurations, said first slide cover is installed to a first end side in said axial direction of said slider, and said second slide cover is installed to a second end side of said slider arranged with said driving source disposed on said side opposite to said first slide cover.

4. The actuator according to claim 3, wherein a surface area of said first slide cover is smaller than a surface area of said second slide cover.

5. The actuator according to claim 3, wherein said first slide cover and a flange section of a ball screw nut are installed to an end surface of said slider closely and substantially in parallel to one another respectively.

6. The actuator according to claim 3, wherein a curved surface, which functions as a relief area for a cylindrical section of a ball screw nut, is formed at a central upper portion of said first slide cover.

7. The actuator according to claim 3, wherein said second slide cover is formed with an opening having a substantially U-shaped cross section for installing a cylindrical section of a ball screw nut.

8. The actuator according to claim 7, wherein said second slide cover is provided with a grease nipple section for supplying grease via a passage communicating with a ball return groove.

9. The actuator according to claim 2, further comprising a timing belt which runs over a first pulley connected to said ball screw shaft and a second pulley connected to a rotary drive shaft of said rotary driving source respectively.

10. The actuator according to claim 1, wherein said first guide rail and said second guide rail each comprises a first portion having a circular arc-shaped cross section, and another portion having a non-circular cross section immediately adjacent to and integral with said circular arc-shaped cross section, said first guide rail and said second guide rail each being integrally formed by said first portion and said second portion, and wherein said non-circular cross section prevents rotation of said first guide rail and said second guide rail within said first and second long grooves, respectively.

11. The actuator according to claim 1, wherein a surface area of said first slide cover is smaller than a surface area of said second slide cover.

12. The actuator according to claim 1, wherein said first slide cover and a flange section of a ball screw nut are installed to an end surface of said slider closely and substantially in parallel to one another respectively.

13. The actuator according to claim 1, wherein a curved surface, which functions as a relief area for a cylindrical section of a ball screw nut, is formed at a central upper portion of said first slide cover.

14. The actuator according to claim 1, wherein said second slide cover is formed with an opening having a substantially U-shaped cross section for installing a cylindrical section of a ball screw nut.

15. The actuator according to claim 14, wherein said second slide cover is provided with a grease nipple section for supplying grease via a passage communicating with a ball return groove.

16. The actuator according to claim 3, wherein said driving force-transmitting mechanism includes a ball screw shaft which is rotatable in a predetermined direction in accordance with a driving action of said rotary driving source, and a ball screw nut which is formed with a penetrating screw hole to be screw-engaged with said ball screw shaft; and said ball screw nut comprises a cylindrical section and a flange section.

17. The actuator according to claim 16, further comprising a timing belt which runs over a first pulley connected to said ball screw shaft and a second pulley connected to a rotary drive shaft of said rotary driving source respectively.

* * * * *